United States Patent
Ransford et al.

[11] 3,781,056
[45] Dec. 25, 1973

[54] LOGGING GRAPPLE

[75] Inventors: Neil Edward Ransford, Dubuque, Iowa; Leland Glen Gilbert, Moerfelden, Germany; Richard Herman Hunger, Dubuque, Iowa

[73] Assignee: Deere & Company, Moline, Ill.

[22] Filed: Oct. 12, 1971
(Under Rule 47)

[21] Appl. No.: 188,397

[52] U.S. Cl. .................. 294/112, 212/7, 214/147 G
[51] Int. Cl. .............................................. B66c 1/42
[58] Field of Search .................... 294/106, 108, 111, 294/112; 37/183 R, 183 A, 186, 187, 188; 212/7, 55; 214/147 R, 147 AS, 147 G, 92

[56] References Cited
UNITED STATES PATENTS

| | | | |
|---|---|---|---|
| 3,620,394 | 11/1971 | Symons et al. .................... | 214/147 G |
| 500,818 | 7/1893 | Price .................................. | 37/184 A |
| 3,099,476 | 7/1963 | Miller ................................. | 294/112 |
| 2,025,340 | 12/1935 | Crocker ........................... | 294/112 X |
| 3,082,031 | 3/1963 | Lindberg ........................... | 294/111 |

*Primary Examiner*—Evon C. Blunk
*Assistant Examiner*—Johnny D. Cherry
*Attorney*—H. Vincent Harsha et al.

[57] ABSTRACT

A log skidding tractor has a grapple-positioning boom mounted thereon. A cable-operated grapple is releasably coupled to the boom and is placed into log grasping positions by the boom. A cable for closing the tongs of the grapple is connected to a winch mounted on the tractor, which winch is operated to tension the cable and close the grapple. A latch mechanism on the grapple holds the tongs closed and permits the cable tension to be relaxed whereby the grapple may be released from the boom and the tractor may be driven to a more favorable position for skidding the load held by the grapple.

15 Claims, 7 Drawing Figures

*INVENTORS*
RICHARD H. HUNGER
NEIL E. RANSFORD
LELAND G. GILBERT

LOGGING GRAPPLE

BACKGROUND OF THE INVENTION

The present invention relates to a logging grapple and more particularly relates to a cable-operated grapple having means for latching the tongs closed on a load so that the load will be tightly gripped even when the operating cable is not in tension.

The current trend in apparatus for skidding felled trees in and from the woods to a landing is toward a type including an articulated logging tractor equipped with a boom from which a grapple is releasably suspended. In these apparatus, the boom properly positions the grapple for grasping one or more trees adjacent an end thereof. The tree end or ends are then elevated from the ground and the remainder of the load is skidded. A length of cable is connected between a winch on the tractor and the grapple and if the tractor encounters undesirable tractive or stability conditions, the grapple and its load are dropped permitting the tractor to be maneuvered to a more desirable location. The winch is then operated to retrieve the grapple and its load.

The current grapples, however, do not have an effective means for keeping a grip on the trees in a load once the grapple is dropped. As a result, the largest load a skidder can now pick up is limited by the operator's confidence that he can deliver the load to a landing without undue difficulty.

SUMMARY OF THE INVENTION

According to the present invention there is provided a novel cable-operated grapple and, more particularly, there is provided a grappel which is especially adapted for log skidding operations.

An object of the invention is to provide a compact pulley and cable arrangement for closing the tongs on a load and for keeping the grapple in a proper attitude when the grapple is being retrieved.

Another object is to provide releasable latch means for locking the tongs on a load.

Still another object is to provide a latch, as described above, which is remotely controllable from the operator's station.

These and other objects will become apparent from the ensuing description and the appended drawings.

DESCRIPTION OF THE PREFERRED EMBODIMENT

Figure 1:
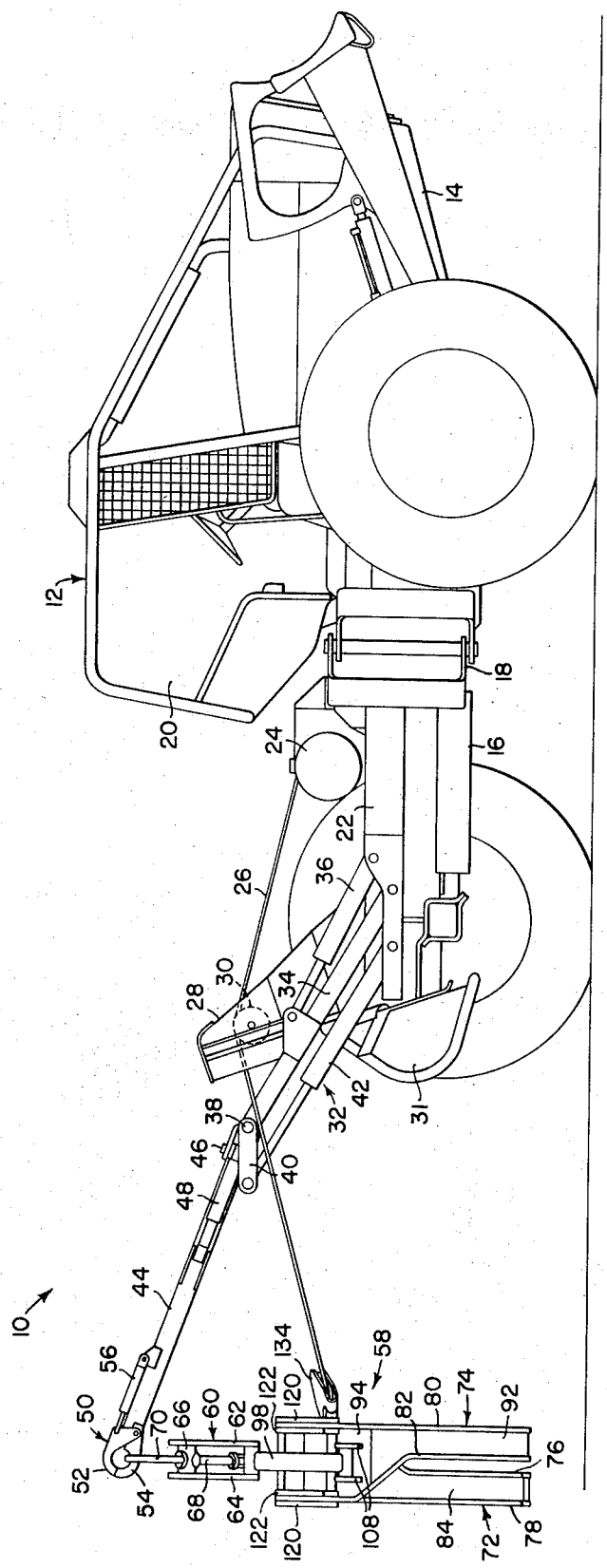
FIG. 1 is a side view of a logging apparatus in which the present invention is embodied, and showing parts removed for clarity.

Referring now to FIG. 1, there is shown a logging apparatus indicated in its entirety by the reference numeral 10. The apparatus 10 includes a conventional logging tractor 12 including front and rear sections 14 and 16, respectively, interconnected by a pivot structure 18, permitting articulation between the sections. Located on the front section 14 is an operator's station 20 whereat the controls for the logging apparatus are found.

The rear tractor section 16 includes a frame 22 on which a winch 24 is centrally mounted directly behind the pivot structure 18. A cable 26 is wound about the winch 24 and extends rearwardly to a fairlead 28, that is fixed centrally at the rear of the frame 22. The fairlead 28 includes a transverse roller 30 rotatably mounted in its upper end and the cable 26 passes over the roller 30. A butt pan 31 is fixed to the rear of the frame 18 in a location generally vertically below the roller 30.

Also mounted on the frame 18 is a boom 32, which includes a pair of parallel inner arms 34 (only one shown) disposed in straddling relationship to the fairlead 28 and pivoted at their lower ends for fore-and-aft swinging. Selective swinging is accomplished by simultaneous operation of a pair of hydraulic actuators 36 (only one shown) respectively pivotally interconnected between the pair of arms 34 and the frame 22. A transverse cross-member 38 is pivotally received in the outer ends of the arms 34 for rocking about a horizontal axis. For this purpose, a crank arm 40 is fixed to the member 38 and a hydraulic actuator 42 is pivotally interconnected between the arm 40 and the frame 22. An outer boom arm 44 is pivoted, as at 46, to the cross-member 38 for lateral swinging and a hydraulic actuator 48 is pivotally interconnected between the cross-member 38 and the arm 44 for selectively adjusting the latter. Thus, it can be seen that the boom 32 may be positioned to various positions relative to the frame 18 through selective actuation of the pair of actuators 36, the actuator 42 and the actuator 48.

Fixed to the outermost end of the boom 32 is a releasable connector 50 including a pair of opposed jaws 52 and 54. The jaw 52 is hinged for swinging movement toward and away from the jaw 54 and a hydraulic actuator 56 is pivotally interconnected between the jaw 52 and the arm 44 for accomplishing such movement.

Releasably suspended from the connector 50 is a grapple 58. The grapple 58 includes a yoke 60 including a pair of fore-and-aft spaced, parallel, transversely extending, inverted V-shaped members 62 and 64 having a swivel 66 pivotally received in the apices thereof. A lost motion connection is formed between the yoke 60 and the connector 50 through means of a rod 68, which is slidably received in the swivel 66, for a purpose explained below. A ring 70 is pivotally received in the upper end of the rod 68 and is captively but loosely held by the connector 50. The rod 68 includes a shoulder 71, adjacent the lower end thereof, which keeps the rod from being withdrawn from the swivel 66 and which abuts against the bottom of the yoke 60, when the grapple is suspended from the boom 32.

Figure 2:
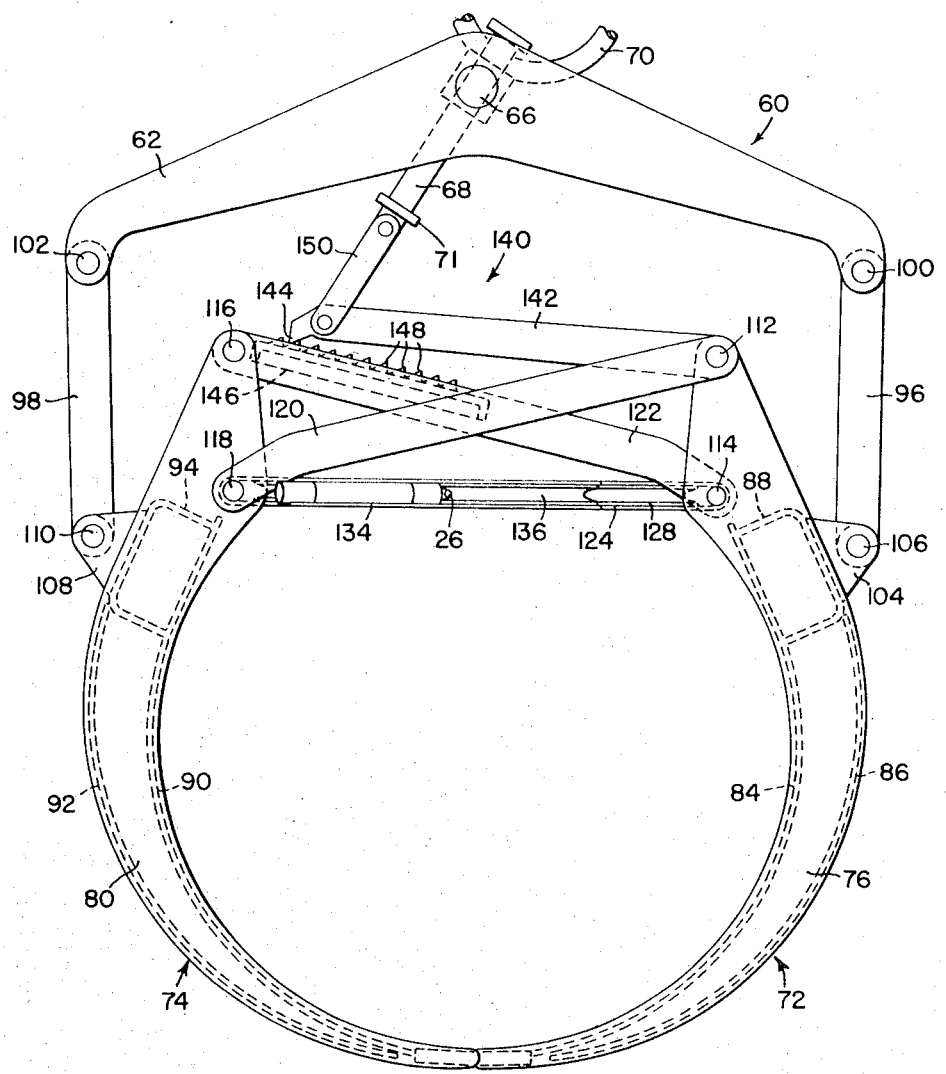
FIG. 2 is an enlarged front elevational view of the grapple shown in FIG. 1, with the grapple being illustrated in a condition wherein the tongs are at an intermediate position.

A pair of opposed, right and left tongs 72 and 74, respectively, as viewed in FIG. 2, are located below the yoke 60 and are symmetrically spaced relative to a longitudinal vertical plane passing through the apex of the yoke 60. As can best be seen in FIG. 1, the tong 72 inlcudes a pair of forward and rear plates 76 and 78, and the tong 74 includes a similarly disposed pair of plates 80 and 82. The plates 76 and 78, of the tong 72, have respective parallel, arcuate, inner and outer edges, which converge from top to bottom. The plates 76 and 78 are interconnected by inner and outer arcuate straps 84 and 86, which respectively extend adjacent said inner and outer edges and terminate short of the upper ends of the plates 76 and 78. A channel member 88 is fixed between the plates 76 and 78 with its legs against the upper portion of the inner strap 84 and with its web forming a continuation of the upper end of the outer strap 86.

Figure 4:
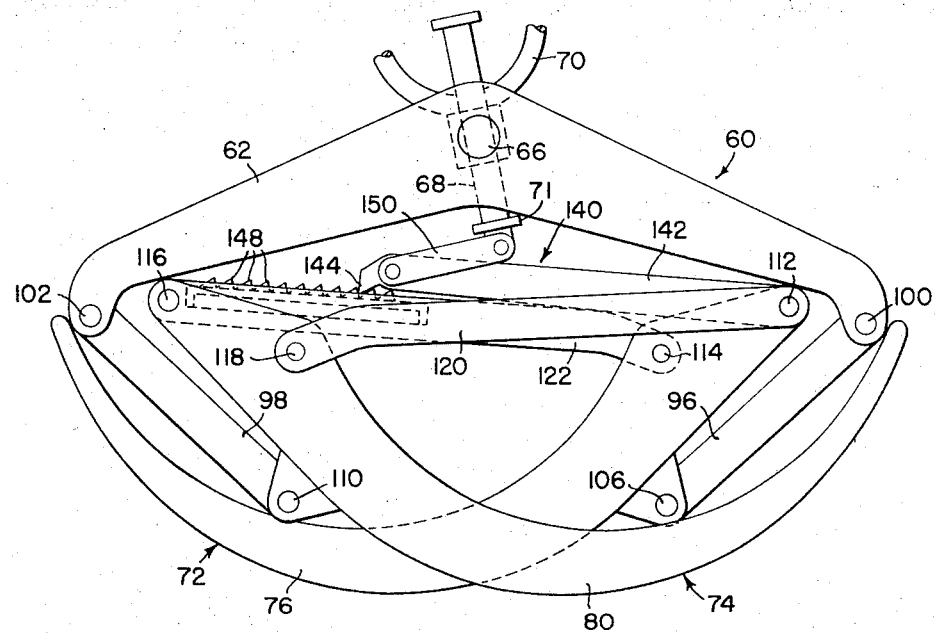
FIG. 4 is a view similar to FIG. 2 but showing the grapple in a condition wherein the tongs are in the fully closed position and showing the pulley and cable arrangement removed.
Figure 5:
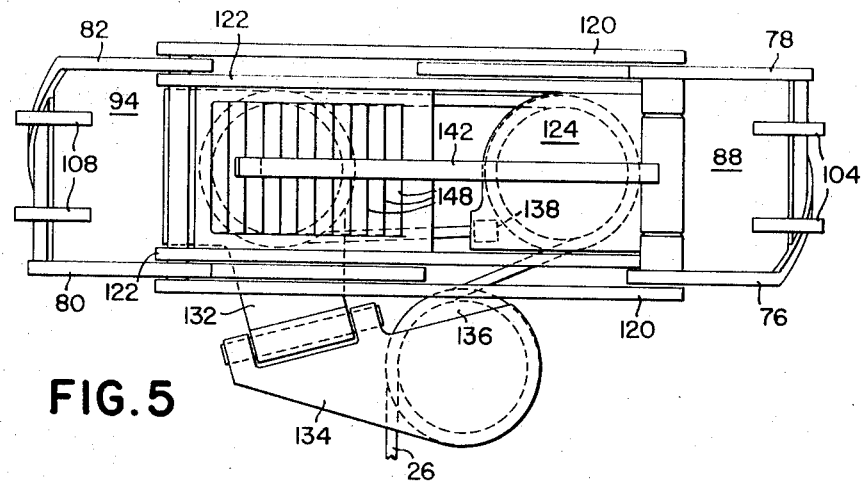
FIG. 5 is a top plan view of the grapple shown in FIG. 2 with the yoke removed.
Figure 6:
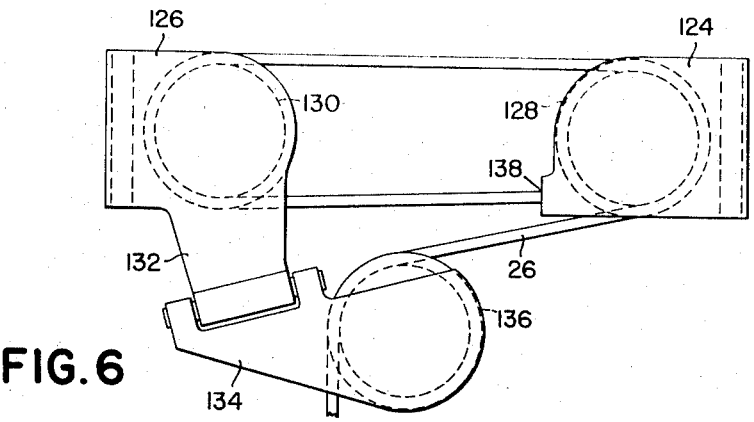
FIG. 6 is a top plan view of the pulley and cable arrangement as it would appear in FIG. 3.
Figure 7:
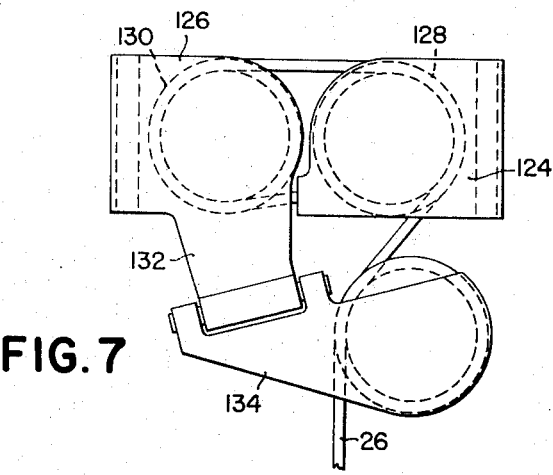
FIG. 7 is a top plan view of the pulley and a cable arrangement as it would appear in FIG. 4.

The plates 80 and 82 of the tong 74 are a mirror image of the plates 76 and 78 and are similarly interconnected to each other by inner and outer straps 90 and 92 and by a channel member 94. It is to be noted that the lower ends of the rear plate 78 of the tong 72 and the forward plate 80 of the tong 74 are offset, respectively forwardly and rearwardly from their upper ends, a distance permitting the lower ends of the tongs 72 and 74 to assume overlapped positions, such as the fully closed position illustrated in FIG. 4.

A pair of like links 96 and 98 have their upper ends located respectively between the right and left ends of the yoke members 62 and 64, whereat they are pivotally mounted by means of a pair of fore-and-aft pins 100 and 102. The lower end of the link 96 is located between a pair of ears 104 fixed to the web of the channel member 88 and is pivotally secured thereto by means of a fore-and-aft pin 106. Similarly, the lower end of the link 98 is located between a pair of ears 108 fixed to the web of the channel member 94 and is pivotally secured thereto by a fore-and-aft pin 110.

As viewed in FIG. 2, the upper end of the tong 72 is provided with a pair of fore-and-aft extending, vertically spaced pivot pins 112 and 114 and the upper end of the tong 74 is provided with a pair of fore-and-aft extending, vertically spaced pivot pins 116 and 118. Connected between the upper pivot pin 112 in the tong 72, and the lower pivot pin 118, in the tong 74, is a first pair of spaced, parallel tie links 120 which straddle the tongs 72 and 74. Connected between the lower pivot pin 114, in the tong 72, and the upper pivot pin 116, in the tong 74, is a second pair of spaced, parallel tie links 122, the opposite ends of which are located between the tong plates 76 and 78 and between the ton plates 80 and 82. The pairs of links 120 and 122 act to cause the tongs 72 and 74 to open and close symmetrically with respect to the longitudinal vertical plane extending through the apex of the yoke 60.

The means for closing the tongs 72 and 74 includes first and second generally horizontal pulley mounting brackets 124 and 126 respectively pivotally mounted on the lower pivot pins 114 and 118 in the tongs 72 and 74. A pair of pulleys 128 and 130 are respectively rotatably mounted on the brackets 124 and 126 in alignment between the tongs 72 and 74. The pulley bracket 126 includes a forwardly extending portion 132 which is hingedly interconnected with a third pulley bracket 134 which carries a third rotatably mounted pulley 136. The cable 26 extends around the left side of the pulley 136, the right side of the pulley 128, the left side of the pulley 130 and back toward the pulley 128 where its end is fixed at 138 to the bracket 124. Thus, it can be seen that when the winch 24 is operated to wind the cable 26 thereabout, the cable will be tensioned and the pulley brackets 124 and 126 will pull the pins 114 and 118 towards each other and this action will be transferred through the pairs of tie links 120 and 122 to move the tongs toward the fully closed position illustrated in FIG. 4.

Figure 3:
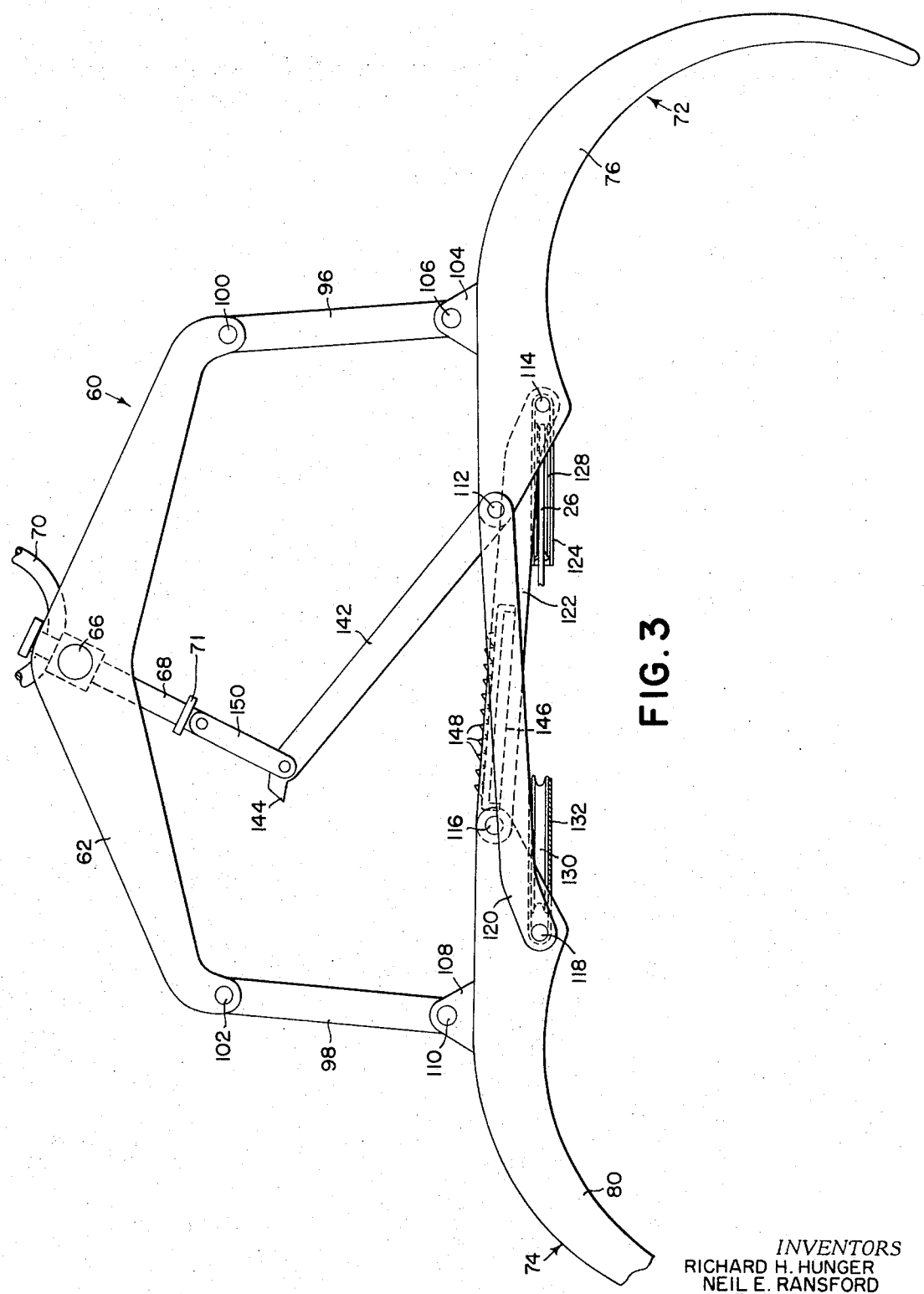
FIG. 3 is a view similar to FIG. 2 but showing the grapple in a condition wherein the tongs are in the fully open position and only partially showing the pulley and cable arrangement.

It should be noted that when the tension in the cable 26 is relaxed, the weight distribution of the tongs 72 and 74, and the members carried thereby, relative to the pivot pins 106 and 110 will cause the tongs to gravitate to the fully open position illustrated in FIG. 3.

A latch 140 is provided for locking the tongs 72 and 74 on a load, when the grapple 58 is dropped from the boom 32 and the cable 26 is relaxed. The latch 140 includes a latch arm 142, which is pivoted at one end to the upper pivot pin 112 in the tong 72 and terminates at its other end in a downwardly directed tang 144. Located between and fixed to the pair of tie links 122 is a plate 146, to the upper face of which is fixed a plualtiy of teeth 148 shaped to receive the tang 144 therebetween. The latch arm 142 is connected to the lower end of the rod 68 by means of a link 150 and the tang 144 can be selectively disengaged from the teeth 148 by pulling upwardly on the ring 70 through means of the boom 32.

In operation, the logging apparatus 10 is readied for moving to a logging site by actuating the winch 24, to wind in the cable 26, and by actuating the hydraulic actuators 36, 42 and 48 to swing the boom 32 to tightly position the grapple 58 against the fairlead 28 and the butt pan 31. The pulleys 128, and 130 and 136, about which the cable 26 is trained, are all located in a central region of the grapple 58, and the tension in the cable 26 will keep the grapple 58 from swinging relative to the boom 32.

When the tractor 12 arrives at the logging site, the winch 24 is actuated to relax the cable 26, thus permitting the tongs to gravitate to the fully open position illustrated in FIG. 3. The boom positioning actuators 36, 42 and 48 are then selectively actuated to position th tongs 72 and 74 in straddling relationship to a desired load to be skidded. The winch 24 is then actuated to tension the cable 26 and this tensioning force acts through the pulleys 128 and 130 and their respective mounting brackets 124 and 126 to close the tongs 72 and 74 upon the load. Thereafter, the boom 32 is raised and the winch 24 is actuated to raise the leading end of the load from the ground and position it closely adjacent the butt pan 31. It is important to note that almost the entire weight of the load is borne solely by the cable 26 and the fairlead 28 so that a heavily constructed boom is not necessary and the size of the boom 32 is dictated only by the strength necessary to lift the weight of the grapple 58. The thusly loaded tractor 12 is then driven toward a desired landing.

Should the tractor 12 encounter a soft stretch, or a relatively steep incline, along the path to the landing area, it may be desirable or necessary to drop the load supported by the tractor 12. To do this, the winch 24 is actuated to permit the grapple 58 to lower to the ground while at the same time maintaining sufficient tension in the cable 26 to keep the tongs closed. The boom 32 is lowered to slide the rod 68 downwardly through the swivel 26 to cause the latch arm 142 to be swung toward the teeth 148 to engage the tang 144 therewith. The actuator 56 is then actuated to open the jaws 52 and 54 of the connector 50 and the boom 32 is swung away from the ring 70. The winch 24 is then actuated to permit the free unwinding of the cable 26 and the tractor 12 is maneuvered to terrain having more desirable tractive and/or stability qualities. The winch 24 is then actuated to retrieve the grapple 58 and the load held thereby. Since the latch 140 remains locked during retrieval of the load, there is little possibility that any of the load will slip from the grasp of the tongs. The reliability of the latch 140 is enhanced by the fact that the cable 26 is attached to and associated with only centrally-located elements of the grapple 58, and thus, tends to maintain the grapple 58 upright, as it is retrieved, which keeps the ring 70 from becoming snagged in undergrowth or obstacles along the logging trail.

When the grapple 58 is winched in to a position within the reach of the boom 32, the connector 50 is again holdingly engaged with the ring 70. Since the cable 26 is now in tension, the latch 40 may be disengaged and this is donw merely by raising the boom 32 to pull upwardly on the rod 68 and the latch arm 142. The load can then be dropped at a desired landing by merely relaxing the cable 26.

We claim:

1. In combination with a logging vehicle equipped with a winch and a load-elevating means, an improved grapple comprising: a yoke; remotely actuatable connector means releasably securing said yoke to said elevating means; a pair of tongs located to one side of said yoke oppositely of said elevating means; link means pivotally suspending said tongs from said yoke for movement between a spread apart first position and a log-grappling second position; grapple operating means operatively connected to said tongs for moving the same to said second position; and latch means operatively connected to said tongs and to said elevating means and being actuatable, by said elevating means, between latched and unlatched positions for respectively fixing and releasing said tongs in and from selected positions.

2. The invention defined in claim 1 wherein said elevating means includes a boom; and said actuatable connector means interconnecting said grapple and said boom.

3. The invention defined in claim 2 wherein said latch means includes a link pivotally interconnected between said tongs and having a plurality of upwardly facing teeth spaced along the upper side thereof; a latch arm pivotally connected to one of said tongs for swinging movement toward and away from said teeth and including a tang directed for register with said teeth; and latch operating means being pivotally interconnected between said latch arm and said elevating means and being responsive to downward and upward movements of said elevating means relative to said yoke for respectively engaging and disengaging said latch arm with, and from, said teeth.

4. The invention defined in claim 3 wherein said latch operating means includes a rod; a swivel being centrally located on said yoke and said rod being slidably received in said swivel.

5. The invention defined in claim 1 wherein said latch means includes a link pivotally interconnected between said tongs and having a plurality of upwardly facing teeth spaced along the upper side thereof; a latch arm pivotally connected to one of said tongs for swinging movement toward and away from said teeth and including a tang directed for register with said teeth; and latch operating means being pivotally interconnected between said latch arm and said elevating means and being responsive to downward and upward movement of said elevating means relative to said yoke for respectively moving said latch arm downwardly and upwardly for respectively engaging and disengaging said latch arm, with and from, said teeth.

6. The invention defined in claim 5 wherein said latch operating means includes a rod; a swivel being centrally located on said yoke and said rod being slidably received in said swivel.

7. The invention defined in claim 1 wherein said grapple-operating means includes a pulley and cable means intervening between said tongs and including first and second pulley brackets pivotally connected respectively to said pair of tongs for movement parallel to the movement of said tongs; first and second pulleys respectively rotatably mounted, in said first and second brackets, about axes extending crosswise to said bracket pivot axes; and a cable having one end fixed to one of said brackets and being trained about said pulleys and fixed to said winch such that when said winch is operated to wind said cable thereabout, said cable is tensioned to cause said grapples to move to said second position.

8. The invention defined in claim 7 and further including a third pulley bracket vertically pivotally connected to, and projecting toward said vehicl from, one of said first and second pulley brackets; a third pulley rotatably mounted in said third bracket about an axis extending crosswise to said third bracket pivot axis; and said cable being guidingly trained on said third pulley.

9. The invention defined in claim 7 wherein the pivot axes on which said first and second pulley brackets are mounted are substantially parallel and coplanar.

10. In combination with a logging vehicle of the type including a winch, a roller located on the vehicle rearwardly of and in substantial fore-and-aft alignment with the winch, a cable connected to the winch and extending over and terminating in an end located behind the roller, the winch and roller being so positioned relative to each other that the cable portion extending between the cable end and the winch is moved along a substantially fore-and-aft extending path when the cable end is located directly behind the vehicle and the cable is being spooled on or off said winch, and a vertically swingable boom means being located on the rear portion of the vehicle for raising and lowering loads at the rear of the vehicle, an improved grapple comprising: a yoke; remotely actuatable connector means releasably securing said yoke to said boom means exclusive of said cable and the operation thereof; first and second opposed tongs being spaced to one side of said yoke in a direction opposite from said boom means, link means swingably suspending said tongs from said yoke for movement between a spread apart first position and a log-grappling second position; first and second pulley brackets being respectively pivotally connected to said first and second tongs for swinging movement respectively about first and second axes extending cross-wise to the direction of movement of said tongs; first and second pulleys being respectively rotatably mounted in said first and second pulley brackets for rotation about third and fourth axes extending crosswise to said first and second axes; and said cable end being fixed to one of said cable brackets and said cable being trained about said first and second pulleys such that said grapple tongs will be moved towards said log-grappling position upon said cable being tensioned.

11. The invention defined in claim 10 and further including a third pulley bracket vertically pivotally connected to, and projecting toward said vehicle from, one of said first and second pulley brackets; a third pulley rotatably mounted in said third bracket about an axis extending crosswise to said third bracket pivot axis; and said cable being guidingly trained on said third pulley.

12. The invention defined in claim 10 wherein said first and second tongs each include adjacent and remote ends relative to the distance of the ends from said yoke; said link means pivotally suspending said tongs from said yoke comprising first and second link members respectively having first ends pivotally connected to said yoke and having second ends respectively pivotally connected to said first and second tongs at locations located adjacent to, but spaced toward said remote ends from, said adjacent ends of said tongs; said first and second pulley brackets being respectively pivotally connected to said first and second tongs at locations intermediate said adjacent ends and the location whereat the second ends of said first and second link members are connected; a first tie link structure having a first end pivotally connected to the adjacent end of said first tong and having a second end pivotally connected to the second tong coaxially with said second pulley bracket, and a second tie link structure having a first end pivotally connected to the first tong coaxially with said first pulley bracket and having a second end pivotally connected to said adjacent end of said second tong.

13. The invention defined in claim 12 and further including a third pulley bracket vertically pivotally connected to, and projecting toward said vehicle from, one of said first and second pulley brackets; a third pulley rotatably mounted in said third bracket about an axis extending crosswise to said third bracket pivot axis; and said cable being fuidingly trained on said third pulley.

14. The invention defined in claim 12 and further including latch means for selectively locking said first and second tongs in place; said latch means including a plurality of upwardly facing teeth being spaced along the length of one of said tie link structures in facing relationship to said yoke; a latch member being pivotally connected, at one end to the adjacent end of that tong to which the tie link structure that carries said teeth is not connected, for movement toward and away from said teeth and a tang being formed on said latch member for engagement with said teeth; and remotely operable means being connected to said latch member for selectively moving the latter so as to place said tang into and out of engagement with said teeth for respectively locking and unlocking said tongs.

15. The invention defined in claim 14 wherein said remotely actuatable means comprises a rod; a swivel being pivotally connected to said yoke midway between the locations whereat said first and second links are connected to said yoke, said swivel having an opening therethrough extending crosswise to the pivotal axis of the block; a rod being slidable received in said block; a connector ring being pivotally connected to an upper end of said rod; a link being pivotally connected at one end to a lower end of said rod and being pivotally connected at another end to said latch member; and said remotely actuatable connector means being releasably connected to said connection ring, whereby upward and downward movement of said boom means when the latter is connected to the connection ring will respectively cause upward and downward movement of said latch member and thereby effect the unlocking and locking of said tongs.

* * * * *